United States Patent [19]
Yamada

[11] 3,879,950
[45] Apr. 29, 1975

[54] SPECIAL POWER GENERATING UNIT USING COMPRESSED AIR PRODUCED BY OCEAN WAVE TOGETHER WITH SUPER-HEATED STEAM

[76] Inventor: Kiichi Yamada, No. 15-12, 1-Chome Jingumae, Tokyo, Japan

[22] Filed: Aug. 13, 1973

[21] Appl. No.: 387,715

Related U.S. Application Data

[63] Continuation-in-part of Ser. No. 148,830, June 1, 1971, abandoned.

[52] U.S. Cl. .............. 60/698; 60/674; 60/500; 417/333
[51] Int. Cl. ............ F01k 21/04; F03g 7/00
[58] Field of Search ............. 417/330–334; 60/698, 495, 505, 497, 674

[56] References Cited
UNITED STATES PATENTS

| | | | |
|---|---|---|---|
| 582,282 | 5/1897 | Greiner | 417/332 |
| 693,270 | 2/1902 | Hannah | 417/333 |
| 1,077,509 | 11/1913 | Bemis | 417/330 |
| 1,090,523 | 3/1914 | Farr | 60/39 |
| 3,597,621 | 8/1971 | Yamada | 60/39 |

*Primary Examiner*—Martin P. Schwadron
*Assistant Examiner*—Allen M. Ostrager
*Attorney, Agent, or Firm*—Stevens, Davis, Miller & Mosher

[57] ABSTRACT

A special seashore or offshore electric power generating unit using compressed air together with superheated steam, which stores mechanical energy in the form of compressed air during off-peak load periods by using superfluoius output of the power plant and ocean wave energy. The plant uses the compressed air thus stored for producing electric power during peak-load periods. The compressed air is heated to the temperature of the superheated steam to be mixed therewith, prior to delivery to a turbine for driving an electric generator.

3 Claims, 9 Drawing Figures

FIG_6

FIG_7

FIG_8

3,879,950

SPECIAL POWER GENERATING UNIT USING COMPRESSED AIR PRODUCED BY OCEAN WAVE TOGETHER WITH SUPER-HEATED STEAM

This is a continuation-in-part application of U.S. Patent Application Ser. No. 148,830, now abandoned which was originally filed on June 1, 1971 under the title of "A SPECIAL POWER GENERATING UNIT USING ELECTRICALLY HEATED COMPRESSED AIR TOGETHER WITH SUPERHEATED STEAM."

This invention relates to a seashore or offshore thermal electric power generating unit, and more particularly to a special thermal electric power generating unit using compressed air produced by ocean waves together with super-heated steam.

The inventor has disclosed in his U.S. Patent Application Ser. No. 772,239, now U.S. Pat. No. 3,597,621, a special thermal electric power generating unit using pressurized hot air together with superheated steam, for the purpose of storing surplus electric power in the form of compressed air and regenerating electric power with the compressed air during peak-load periods. The present invention intends to provide a similar electric power generating unit which includes an air compressing station for producing compressed air by using the energy of sea waves for use with the superheated steam during peak-load periods.

According to the aforesaid U.S. Patent Application Ser. No. 772,239, there is provided a special electric power generating unit, which enables the storage of superfluous electric power from conventional thermal power plants, such as midnight output, in the form of compressed air in a tank by driving a pneumatic turbine or an air compressor by using such surplus power, so that electric power can be regenerated by using the thus stored compressed air during the succeeding peak-load period, such as during the daytime when the demand for electric power is high. With the electric power generating unit, the stored compressed air may be conveyed to a special blind drum in the firebox of a boiler through piping at a certain rate, while suitably regulating the pressure of the compressed air, so that pressurized hot air can be produced. Superheated steam delivered from a boiler, or a superheated steam generating chamber thereof, is injected through a special nozzle together with said pressurized hot air, so as to produce a superheated gaseous mixture jet which strikes the runner of a gas turbine to rotate it at a high speed. By driving an electric generator with such gas turbine, electric power can be produced. It is, of course, possible to generate electric power not only during daytime but also at night by using the special thermal electric power generating unit using pressurized hot air together with superheated steam according to the present invention.

Recently, it has been proposed to construct offshore power plants, so as to avoid the environmental pollution problems. If the power plant is constructed offshore or on the seashore of an isolated island, wave energy of the ocean may be utilized to produce compressed air for supplementing the aforesaid use of the off-peak power. More particularly, ocean wave energy may be accumulated in the form of compressed air during offpeak load periods, which compressed air may be used for power generation during peak-load period.

Therefore, an object of the present invention is to provide a special seashore or offshore electric power generating unit using compressed air together with superheated steam, which stores mechanical energy in the form of compressed air during off-peak load periods by using superfluous output of the power plant and ocean wave energy. The power plant regenerates electric energy during peak-load periods by using the compressed air thus stored. The compressed air is heated to the temperature of the superheated steam to be mixed therewith, prior to the delivery to a turbine for driving an electric generator.

To fully utilize the ocean wave energy, a stationary platform is provided above the sea level, and stationary parts of a plurality of air compressors are secured to the platform, while movable parts of the air compressors are secured to floats which are placed on the water level so as to move up and down, in response to the wave motion of the sea water. Thus, the movable portions of the air compressors are driven by the ocean wave motion, so that air at the atmospheric pressure is compressed to a higher pressure level by the compressors. The plurality of the air compressors may be divided into a number of groups, for successively compressing the air in steps to a level which is suitable for storage and for use in the steam power plant during off-peak periods.

For a better understanding of the invention, reference is made to the accompanying drawings, in which.

Like parts are designated by like numerals and symbols throughout the different figures of the drawing.

Referring to the figures, a boiler 1 has a firebox 2 and chambers 4 for generating superheated steam at a certain pressure and at a certain temperature. The superheated steam is delivered to a pipe 5, which conveys the superheated steam to a special nozzle 6 where the superheated steam is mixed with the pressurized hot air to produce a superheated gaseous mixture. The special nozzle 6 injects both the superheated steam and the pressurized hot air at a suitable rate toward the runner of a gas turbine 7, so as to rotate the gas turbine 7 at a high speed. The gas turbine 7 drives an electric generator 8, for producing electric energy in response to the rotation of the turbine 7.

When compressed air is heated to 300°C, the compressed air is expanded to a volume more than twice as large as its original volume, and becomes pressurized hot air. In a preferred embodiment of the present invention, the pressure and the temperature of such pressurized hot air are so adjusted as to become the same as the corresponding pressure and the temperature of the superheated steam from the pipe 5, and the pressurized hot air thus adjusted is then fed to the special nozzle 6 and it is mixed with the superheated steam therein.

It is also possible to generate compressed air by using a special prime mover, which was disclosed by the present applicant in his Japanese Pat. No. 192,668, titled "a special intensive prime mover of offset output type," which prime mover is generally designated as 9 in FIG. 1. A tidal prime mover 29, as disclosed by the present applicant in his Japanese Pat. No. 404,162, may also be used for compressing air. By rotating a pneumatic turbine with such special prime mover connected thereto, compressed air can be produced at a very low cost, because an extremely inexpensive energy source is available. The compressed air thus produced is stored in a compressed air tank 10. A known air compressor 11 is provided for producing compressed air by using surplus power from thermal power plants during the night, so as to store the surplus energy in the form of compressed air filled in the compressed air tank 10. In the illustrated embodiment of the invention, both the special prime mover 9 and the known air compressor 11 are used, but it is also possible to dispense with one of them in the unit of the invention.

If the compressed air stored in the tank 10 is used for generating electric power during daytime when the demand for electric power is high, the thermal power plant can be efficiently operated day and night with full output, so that the equipment of the thermal power plant is fully utilized and the cost of the electric power generated can be reduced.

The illustrated embodiment of the present invention further comprises a blower 12, another compressed air tank 13, a motor 14, pipes 15, 16 for feeding the pressurized hot air, a pneumatic turbine 17, another motor 18, a water pump 19 driven by a motor 20, a water supply pipe 21, a steam condenser 22, another water pump 23 driven by a motor 24, a fuel tank 25, an oil pump 26, an injection nozzle 27, a fuel control valve 30, a transmission belt 31, and a flywheel 32.

FIGS. 6 to 9 illustrate a station for compressing atmospheric air to a desired pressure level, which is suitable for storage during off-peak load periods by using ocean wave energy.

It is well known that ocean waves are combinations of horizontal and vertical motions of water on the sea water surface. Individual water molecules are said to move along circular or otherwise closed loop passages. Accordingly, if suitable floats are placed on the ocean water surface while connecting the floats to suitable air compressor elements through piston rods or plungers, compressed air may be produced by using the vertical reciprocation of the floats.

Figure 6:
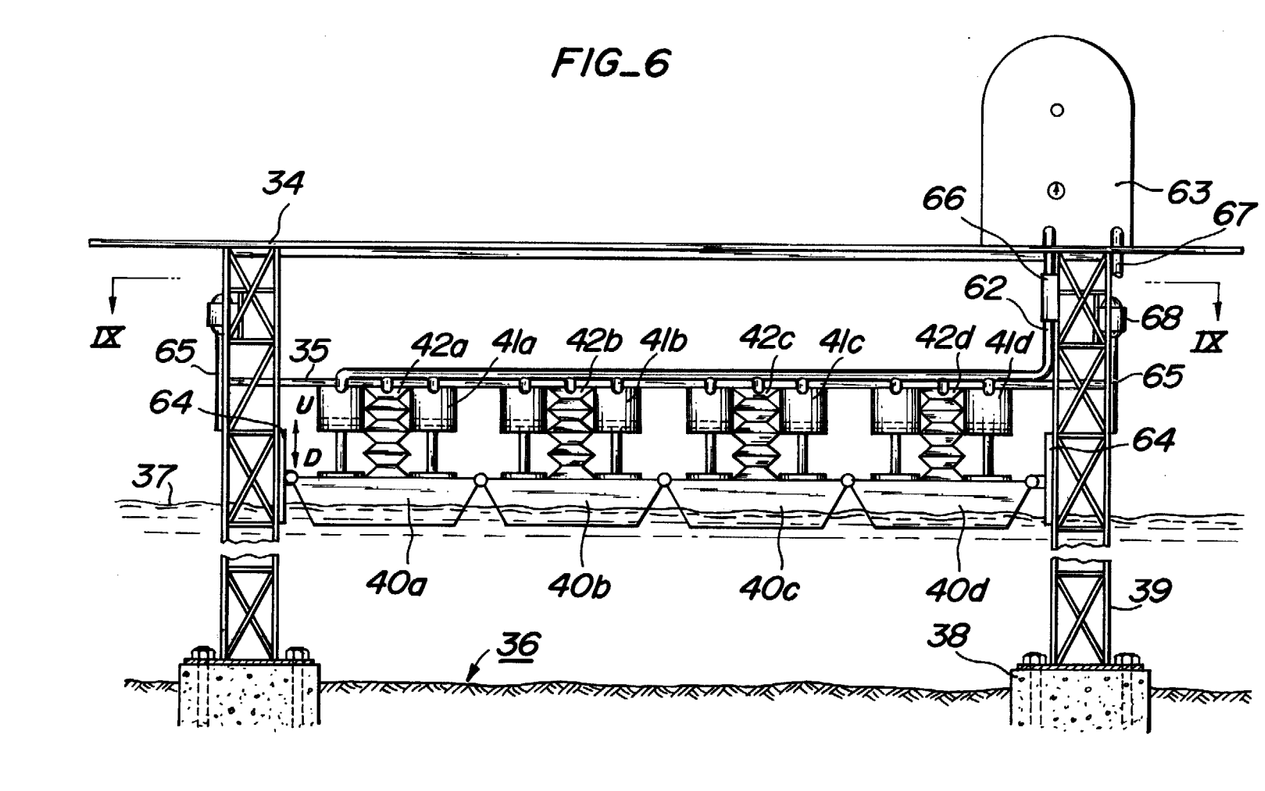
FIG. 6 is a schematic elevation of an air compressor station utilizing ocean wave energy, which is to be incorporated in the electric power generating unit according to the present invention.

In a preferred embodiment of the present invention, as illustrated in FIG. 6, foundations 38 are constructed on sea bed 36, so as to support pillars 39 thereon. The pillars 39 support a top floor 34, on which an air tank 63 is disposed.

In the case of offshore power plant, the boiler 1 and the generator 8 may be installed on the top floor 34, together with another steam piping and the turbine 7, so as to generate electric power on the floor 34. The power may be transmitted to land users through suitable underground cables (not shown). It is also possible to install the power plant as a submarine facility on the sea bed 36, or as an underground facility below the sea bed 36. The choice of the location of the power plant, relative to the water level 37 and the sea bed 36, is not material in the present invention. Accordingly, the facilities, as shown in FIGS. 1 to 5, can be installed on the top floor 34, on the sea bed 36, or under the sea bed 36. Regardless of the choice of such location of the power plant, the air compressor station of FIGS. 6 and 9 can be used advantageously in providing compressed air for meeting peak demand of power consumers and for enhancing the plant efficiency by using the ocean wave energy.

Figure 7:
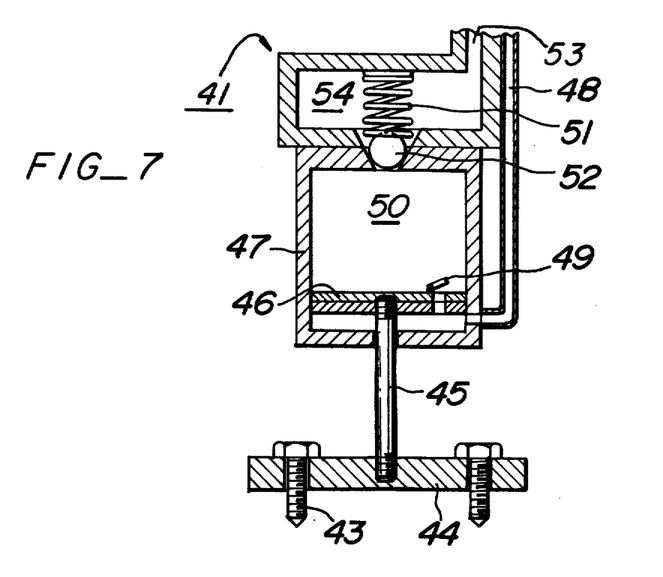
FIGS. 7 and 8 are schematic sectional views, showing two different air compressor structures which can be used in the station of FIG. 6.
Figure 8:
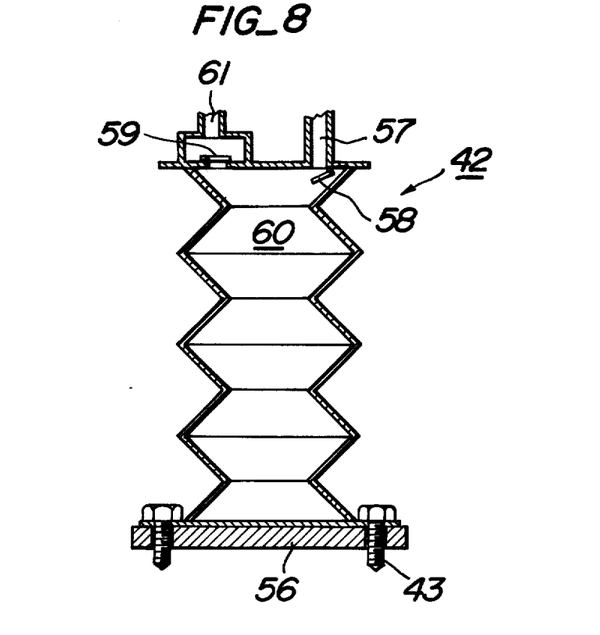

The pillars 39 also carry a stationary platform 35, to which stationary portions of air compressor elements 41a to 41d and 42a to 42d are secured. The details of the air compressor elements are illustrated in FIGS. 7 and 8. Movable parts of the air compressing elements are connected to floats 40a to 40d which are placed on the ocean water surface 37, so as to move vertically, in response to the aforesaid wave motion of the ocean water surface. Suitable guides 64 are provided on the pillars 39 for properly orienting the vertical movement of the floats. Any known floats may be used in the station of FIG. 6, as long as they ensure smooth vertical movement of the movable parts of the air compressor elements, in response to ocean wave motion.

Referring to FIG. 7, the air compressor element 41 (a representative of those which are referred by the symbols 41a to 41d) includes a connecting plate 44 which is connected to one of the floats 40a to 40d by screws 43 or the like. A cylinder 47 of the air compressor element 41 carries a piston 46 which is connected to the connecting plate 44 through a piston rod 45. The piston 46 divides the inside space of the cylinder 47 into two parts: namely, a lower chamber which communicates with a suction port 48, and a compressing chamber 50 above the piston. Piston 46 has a suction check valve 49, so as to compress the air in the chamber 50 by the upward stroke of the piston, which air may be delivered through the suction port 48. The compressed air in the chamber 50 is delivered to a discharge port 55 through a discharge chamber 54, provided that the pressure in the chamber 50 is high enough to move a ball valve 52 upwards against the resiliency of a spring 51 and pneumatic pressure acting downwards from the discharge chamber 54.

FIG. 8 illustrates a bellows type air compressor element 42 consisting of a bellows 60, which includes a bottom connecting plate 56 secured to the float by screws 43 and a top portion secured to the stationary platform 35. The inside space of the bellows 60 communicates with a suction port 57 through a suction check valve 58 and with a discharge port 61 through a discharge check valve 59. Whereby, the bellows 60 sucks air during the downward stroke of the float, while compressing the air during the upward stroke of the float.

Figure 9:
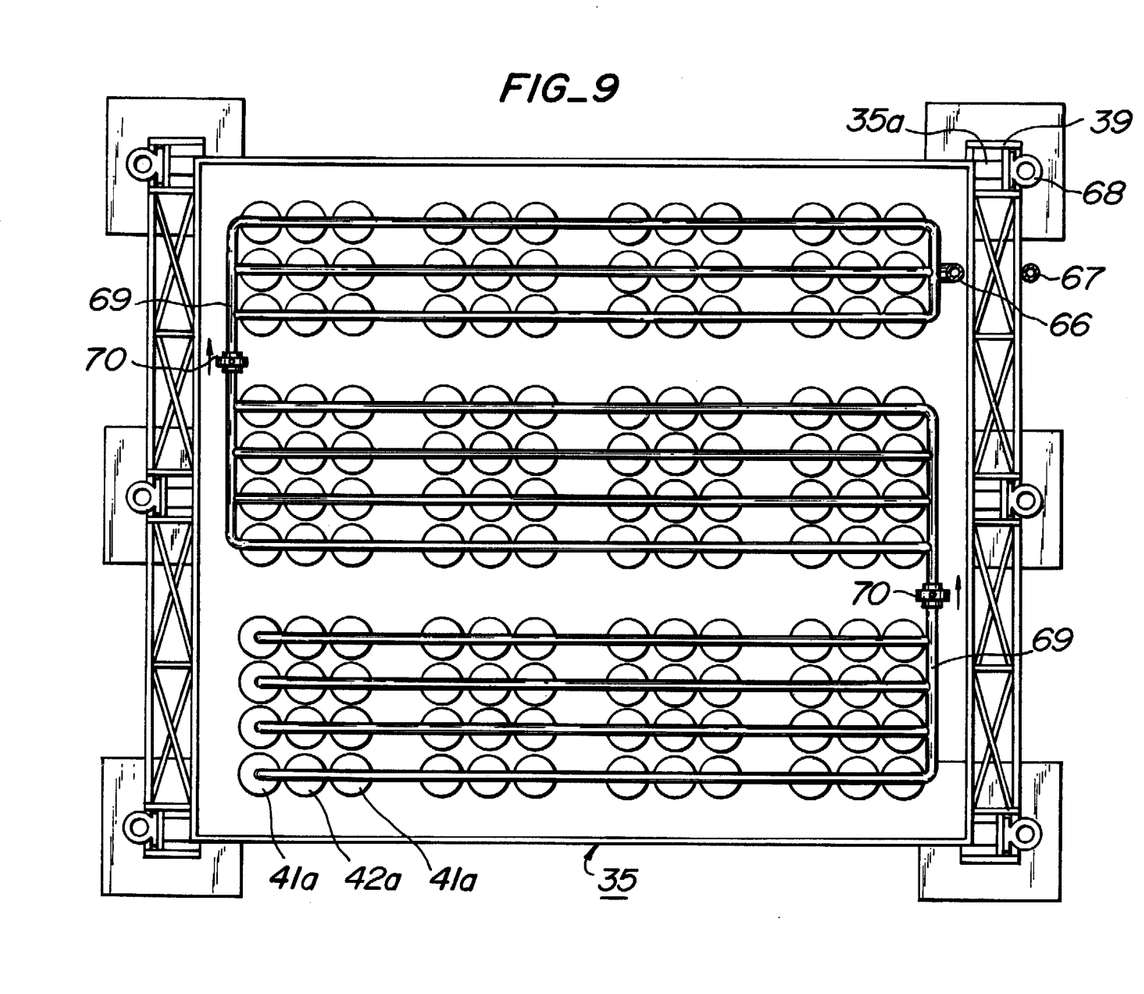
FIG. 9 is a partial plan view of the compressor station, taken along the line IX—IX of FIG. 6.

The floats and the air compressor elements may be grouped, as illustrated in FIG. 9, so as to achieve a high pressure, by additionally compressing the previously compressed air in succession. In the example of FIG. 9, three groups are formed, which are connected by conduits 69, wherein reverse air flow from a high pressure to a low pressure is prevented by check valves 70. The output compressed air from the final stage of the air compressor elements is connected to the air tank 63 through an output conduit 62 including an expansion-absorbing tube 66.

Figure 1:
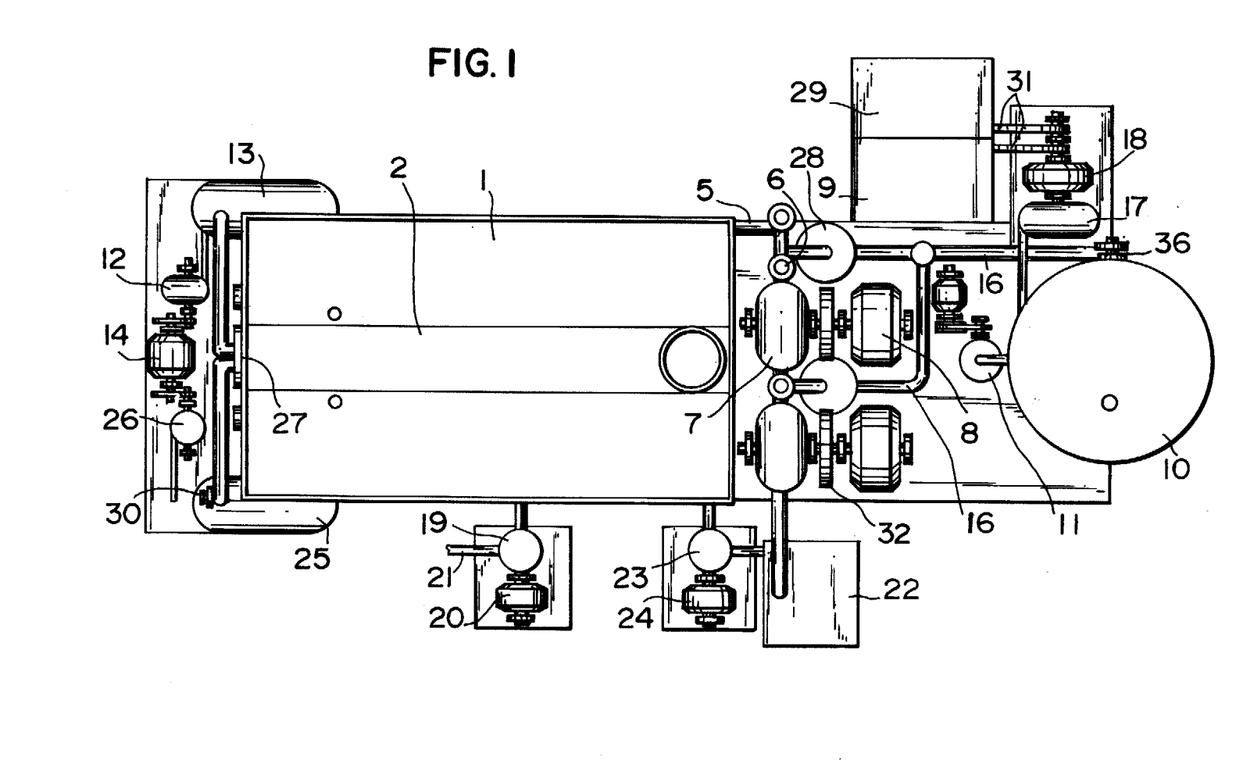
FIG. 1 is a schematic plan view of a thermal electric power generating facility to be used in a seashore or offshore unit according to the present invention.
Figure 2:
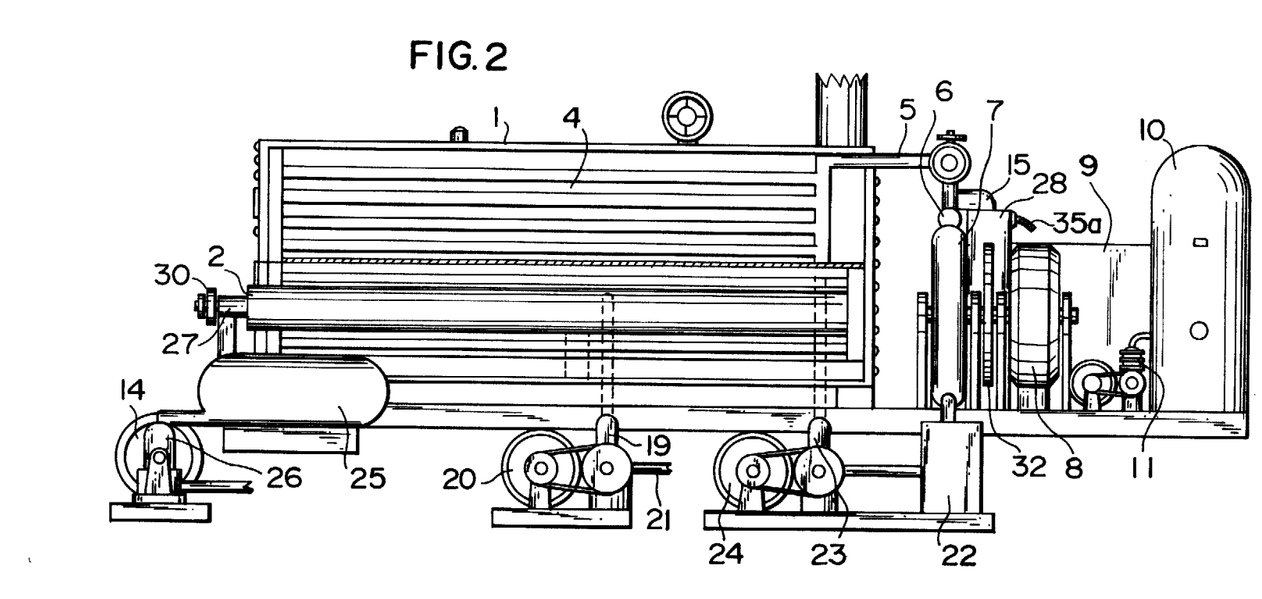
FIG. 2 is a side view of a similar electric power generating unit, according to the present invention.
Figure 3:
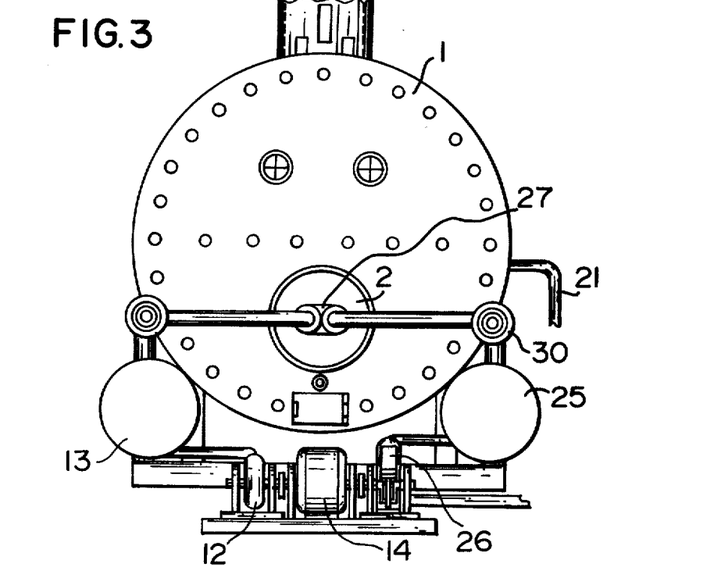
FIG. 3 is a rear view of a boiler used in the unit of FIG. 1.
Figure 4:
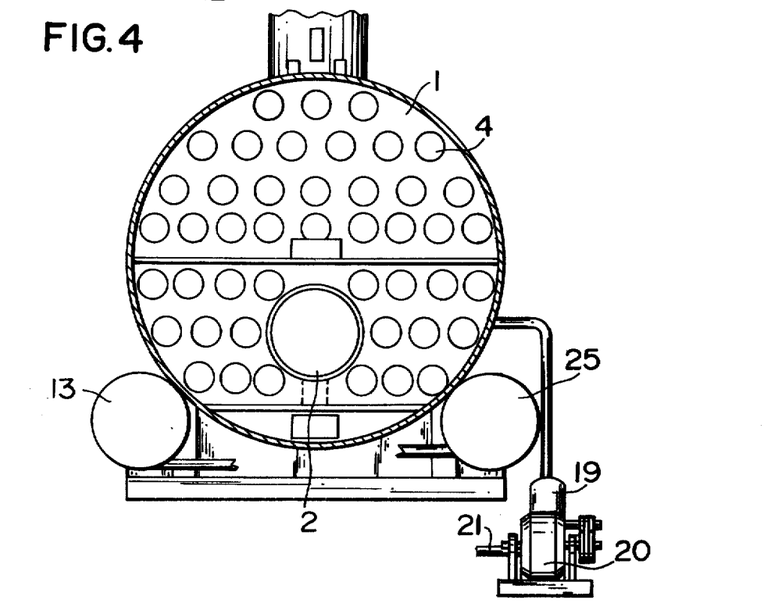
FIG. 4 is a vertical sectional view of the boiler.
Figure 5:
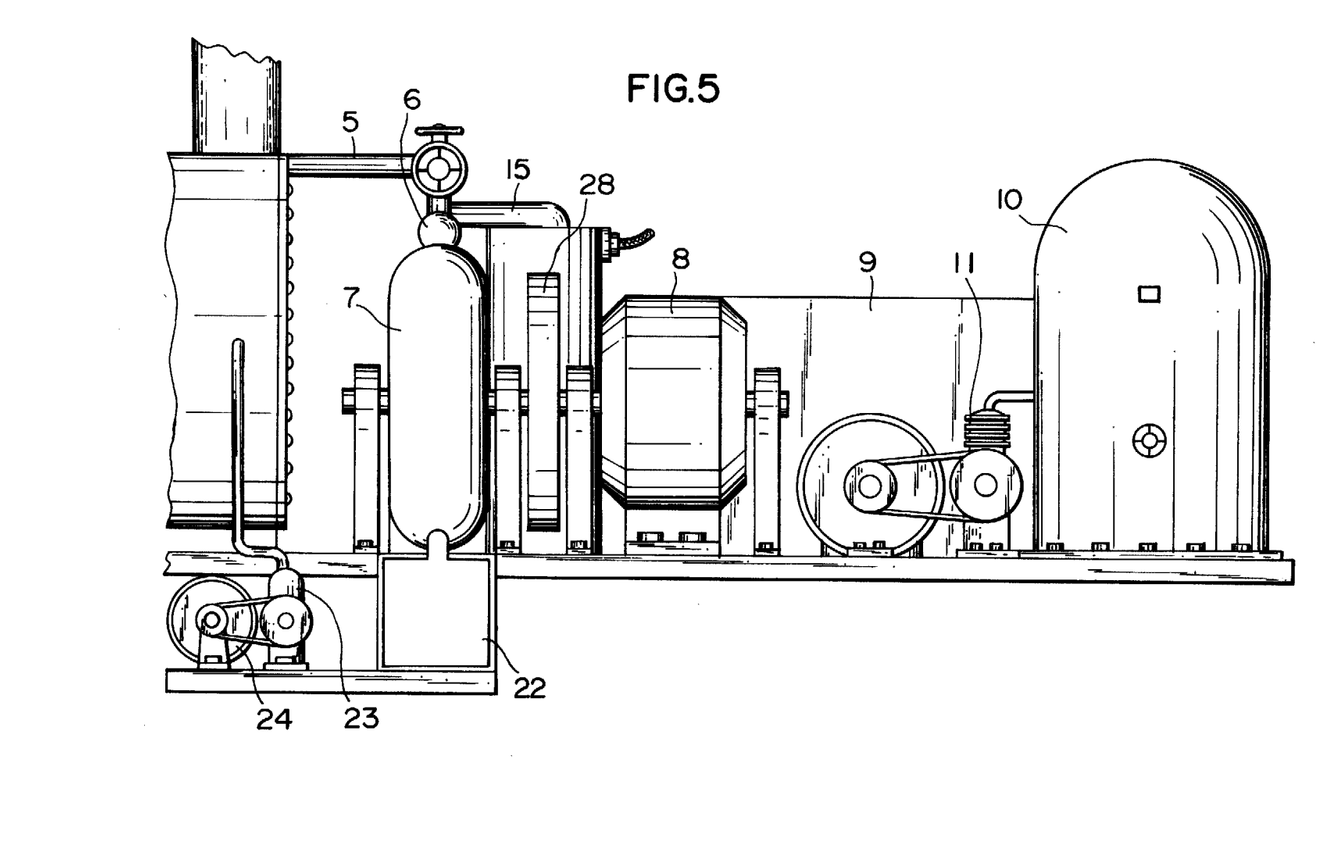
FIG. 5 is an enlarged schematic side view of an electric generator portion of the unit.

It is also possible to eliminate the tank 63 by directly delivering the compressed air to the tank 10 of FIG. 1 by suitable air conduits, especially in the case of an offshore power plant.

The output from the air tank 63 will be delivered to a power plant through a delivery conduit, only a part of which is shown in FIGS. 6 and 9.

Referring to FIG. 6, to meet the variation of the water level, due to tidal movement of water or the like, the stationary platform 35 should preferably be made adjustable. To this end, arms 35a are formed on side edges of the platform 35 so as to extend horizontally away from the platform, and the extended ends of the arms 35a are connected to rack-and-pinion assembly 65. Each assembly 65 is driven by a rack motor 68, so as to selectively move the platform 35, as shown by the arrows U-D of FIG. 6, and to hold the platform at a desired level. The details of the rack-and-pinion mechanism is well known to those skilled in the art, so that such details are not shown here.

The flow of compressed air relative to the storage tank 10 or 63 is regulated by a compressed air regulating valve 36 (not shown in FIG. 6).

For storing electric energy, storage batteries have heretofore been utilized. In addition, for effectively utilizing the surplus midnight output power from thermal power plants, hydraulic pumping-up power stations have been constructed in recent years. However, such pumping-up power stations have numerous difficulties in the equipment thereof. In comparing the electric power generating unit according to the present invention with known thermal power generating units, the amount of steam to be used in the former unit is less than one half of that in the latter unit. Thus, the fuel for power generation, such as heavy oil and coal, can be saved by more than 50 percent. Furthermore, the electric power generating unit according to the present invention can be constructed by slightly modifying existing fossil fuel or nuclear power plants as a compound plant. Such modification for constructing the unit of the present invention can be carried out in a comparatively short period of time, and accordingly, its construction cost is low. As compared with any known steam power plants, the electric power generating unit of the present invention is superior in safety, economy and environmental pollution.

At the present time, electric utility organizations in many countries operate their generating facilities in full during daytime to meet the demand for electric power, but more than 50 percent of the generating facilities become idle at night. Recently, such idle generating facilities are operated at night to run hydraulic pumping-up power stations, but such hydraulic pumping-up power stations have a considerable amount of inherent energy loss. In addition, the construction of hydraulic pumping-up power stations requires a huge capital investment. On the other hand, the unit according to the present invention serves for the purpose of highly efficient energy storage and regeneration thereof. It is an important feature of the invention that the superfluous output from thermal power plants can be stored and regenerated at a limited capital expenditure.

It is, of course, possible to incorporate suitable relay means in the unit of the invention, so that each off-peak load is detected for automatically actuating the air compressor for storing energy and each peak-load is detected for regenerating power from the compressed air.

What is claimed is:

1. An electric power generating unit for installation near a body of water and for generating electrical power from compressed air and steam, comprising:
   a steam generator for producing superheated steam;
   a gas turbine the input end of which is connected to said steam generator for driving said turbine;
   an electrical generator connected to said turbine for generating electrical power from the rotational mechanical output of said turbine;
   an electrically powered first compressor for compressing air using surplus electrical energy from said electrical generator;
   second means for compressing air and means for rigidly supporting said second compressing means above the surface of a body of water, said second means adapted to be mechanically actuated by wave energy from waves in the surface of said body of water;
   a tank for storing compressed air connected to the outputs of said first and second compressors;
   pressure regulating means associated with said tank for controlling the pressure of compressed air within said tank at a desired level; and
   an injection nozzle connecting both said steam generator and said compressed air storage tank to said gas turbine for driving said turbine by steam and/or compressed air.

2. The electric power generating unit of claim 1, additionally comprising means for selectively driving said turbine by steam, or compressed air, or a mixture thereof.

3. The electric power generating unit of claim 1, wherein said second means for compressing air and means for rigidly supporting said second means over the surface of a body of water, comprise: pillars adapted to be secured to the bed of said body of water, and of sufficient length to extend above the surface of said body of water; a platform attached to said pillars above said surface; a plurality of floats floating on said surface, stationary portions of said compressor means secured to said platform and movable parts of said compressor means connected to said floats; guide means secured to said pillars for restricting movements of said floats to substantially vertical movements; and a conduit connecting the output of said second compressing means to said compressed air storage tank.

* * * * *